United States Patent
Obana et al.

(10) Patent No.: US 7,093,766 B2
(45) Date of Patent: *Aug. 22, 2006

(54) IC CARD HAVING MEMORY CONTENTS TRANSFER CONTROL UNIT AND METHOD OF STORING DATA IN IC CARD

(75) Inventors: Manabu Obana, Yokohama (JP); Susumu Okuhara, Yokohama (JP); Hideki Takeyabu, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/002,106

(22) Filed: Dec. 3, 2004

(65) Prior Publication Data

US 2005/0094471 A1    May 5, 2005

Related U.S. Application Data

(63) Continuation of application No. 09/970,774, filed on Oct. 5, 2001, now Pat. No. 6,845,916, which is a continuation of application No. 09/293,766, filed on Apr. 19, 1999, now abandoned.

(30) Foreign Application Priority Data

| Apr. 17, 1998 | (JP) | ................................. 10-107312 |
| Feb. 25, 1999 | (JP) | ................................. 11-047773 |

(51) Int. Cl.
*G06K 19/06* (2006.01)

(52) U.S. Cl. ..................................... 235/492

(58) Field of Classification Search ............... 235/492, 235/487, 380, 382; 710/1, 5
See application file for complete search history.

(56) References Cited

U.S. PATENT DOCUMENTS

| 5,200,600 | A |   | 4/1993 | Shinagawa |
| 5,386,539 | A |   | 1/1995 | Nishi |
| 5,451,763 | A |   | 9/1995 | Pickett et al. |
| 5,796,092 | A | * | 8/1998 | Nagata et al. .............. 235/492 |
| 5,809,241 | A |   | 9/1998 | Hanel et al. |
| 5,811,771 | A |   | 9/1998 | Dethloff |
| 5,910,652 | A |   | 6/1999 | Kuriyama |
| 5,950,013 | A |   | 9/1999 | Yoshimura et al. |
| 5,959,276 | A |   | 9/1999 | Iijima |
| 6,016,963 | A |   | 1/2000 | Ezawa et al. |
| 6,095,412 | A |   | 8/2000 | Bertina et al. |
| 6,126,077 | A |   | 10/2000 | Tanaka et al. |

FOREIGN PATENT DOCUMENTS

DE    196 26 337 A    1/1997

(Continued)

*Primary Examiner*—Thien M. Le
*Assistant Examiner*—Jamara A. Franklin
(74) *Attorney, Agent, or Firm*—Antonelli, Terry, Stout and Kraus, LLP.

(57) ABSTRACT

For addressing a problem of a long connecting time of an IC card with an information processing apparatus and a long external power supply time due to storage of data in a non-volatile memory area even after the IC card has completed processing, the present invention provides techniques for notifying the information processing apparatus connected to the IC card of the completion of the processing at the time the IC card has completed the processing, stopping power externally supplied to the IC card, and switching to an internal power supply unit of the IC card. Subsequently, the internal power supply unit is used to transfer data, the contents of which must be ensured from a volatile memory to a non-volatile memory to thereby solve the problem mentioned above.

8 Claims, 6 Drawing Sheets

FOREIGN PATENT DOCUMENTS

| | | |
|---|---|---|
| EP | 488366 | 6/1992 |
| EP | 526139 | 2/1993 |
| EP | 0-563-997 A1 | 10/1993 |
| GB | 2 257 274 A | 1/1993 |
| GB | 2 292 866 A | 3/1996 |
| JP | 4-241082 | 8/1992 |
| JP | A-H4-241082 | 8/1992 |
| JP | 5250531 | 9/1993 |
| JP | A 877081 | 3/1996 |
| JP | 9259029 | 10/1997 |
| JP | 2000342 | 4/2000 |
| KR | 19898711 | 7/1989 |
| WO | 36947 | 11/1996 |

* cited by examiner

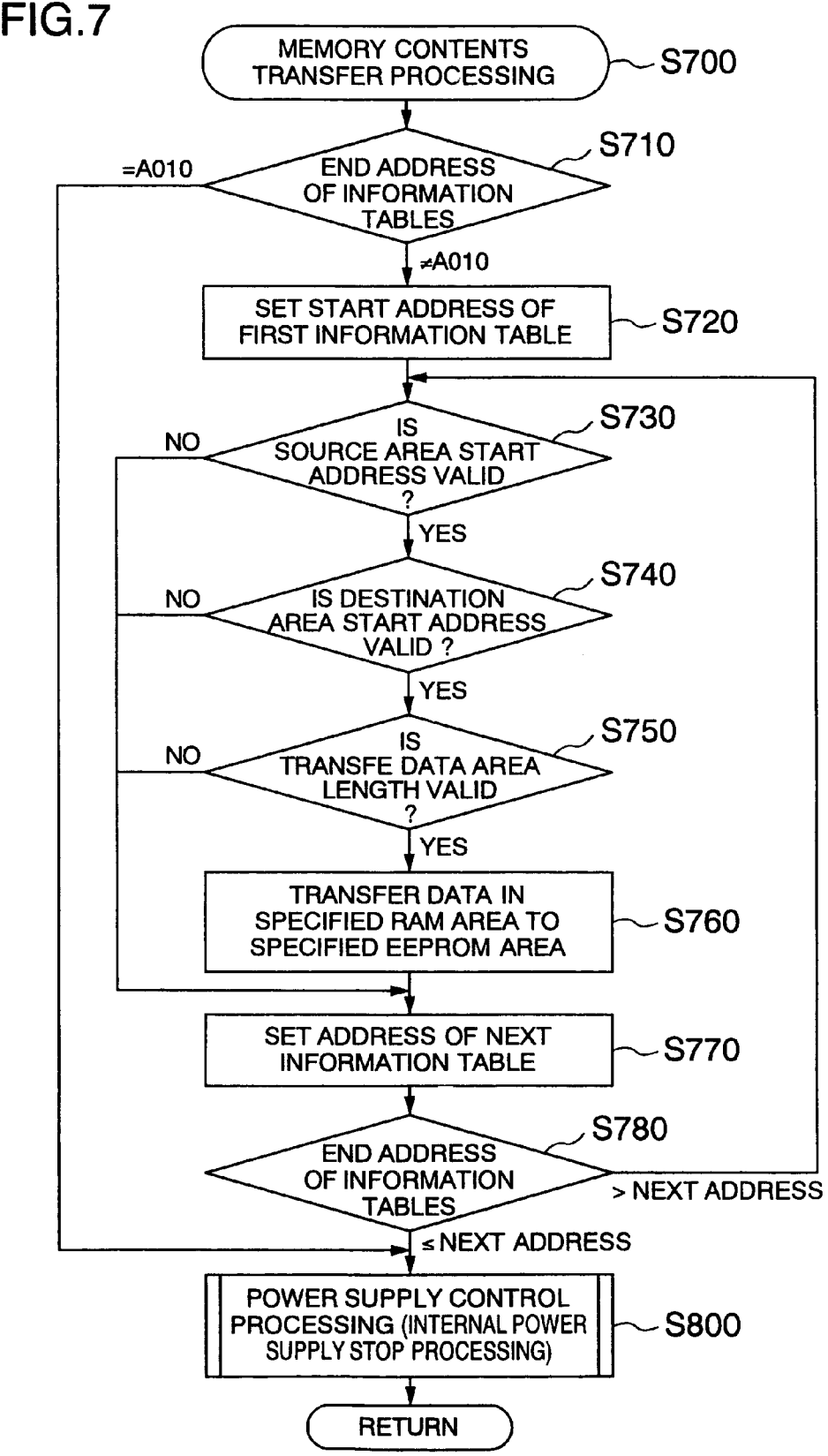

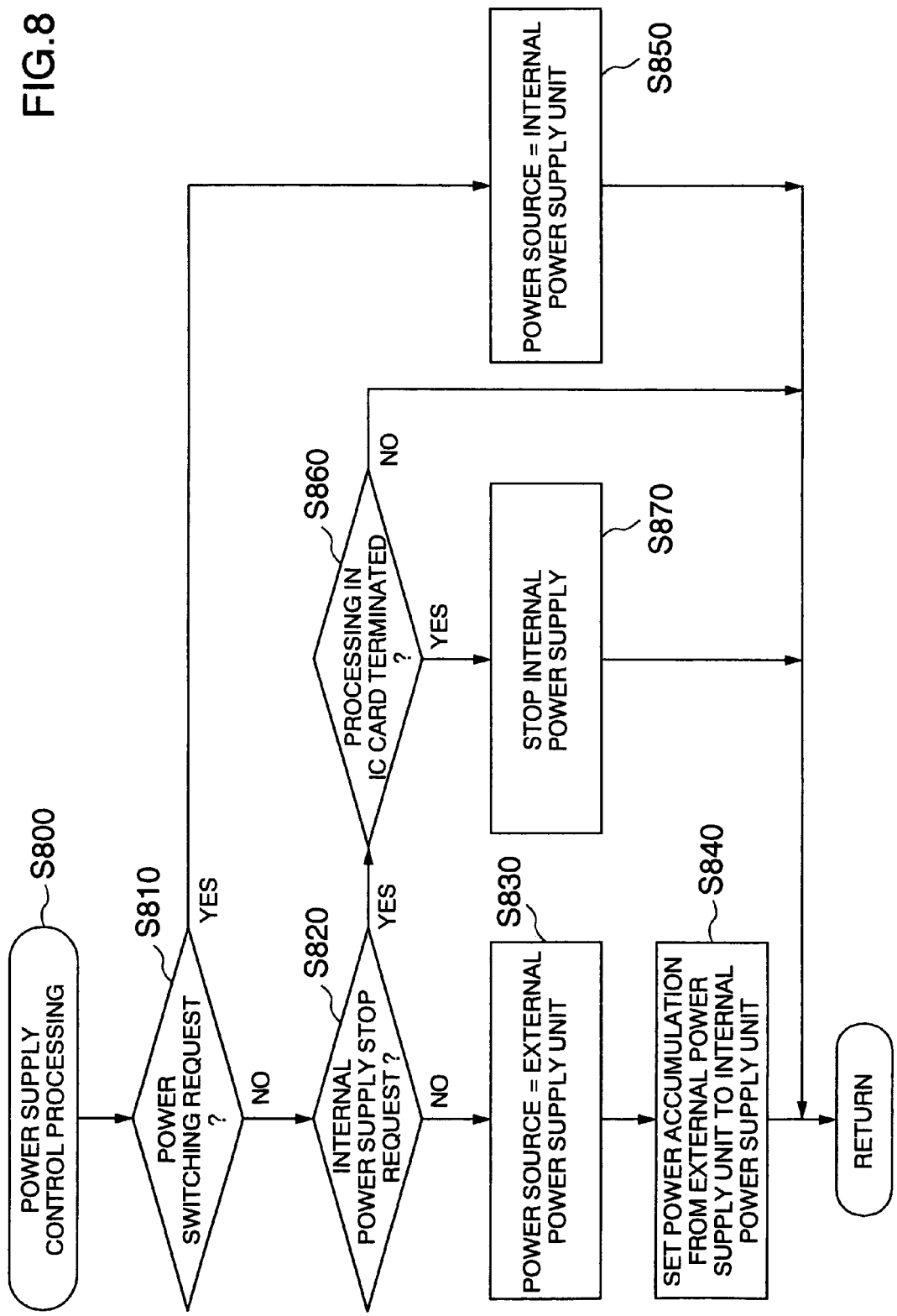

IC CARD HAVING MEMORY CONTENTS TRANSFER CONTROL UNIT AND METHOD OF STORING DATA IN IC CARD

This is a Continuation of Application No. 09/970,774, filed Oct. 5, 2001 now U.S. Pat. No. 6,845,916, which is a Continuation of Application No. 09/293,766, filed Apr. 19, 1999 now abandoned, the entire disclosures of which are hereby incorporated by reference.

BACKGROUND OF THE INVENTION

The present invention relates to an IC card equipped with a plurality of types of update capable memories which update the contents thereof at different processing speeds, and a memory control method therefor.

Conventionally, when information (hereinafter called the "data") received from an information processing apparatus connected with an IC card is stored in a region of memories equipped in the IC card, the data is mainly stored in RAM (Random Access Memory) or in EEPROM (Electrically Erasable and Programmable Read-Only Memory).

When RAM is used to store data, the RAM provides a faster processing speed for updating stored data than EEPROM. However, since the RAM is a volatile semiconductor device, it must be continuously supplied with power for retaining data therein. While a battery may be used for supplying electric power to RAM, the powering of RAM with a battery arises a problem that when the lifetime of the battery expires so that the power supply to RAM is failed, data stored in the RAM will be lost.

When EEPROM is used for storing data, no electric power need to be supplied thereto for retaining stored data because the EEPROM is a non-volatile semiconductor device. However, the EEPROM is disadvantageous in that its processing speed for updating data stored therein is extremely lower as compared with that of RAM.

Therefore, a conventional IC card is equipped with RAM and EEPROM each having a memory capacity required for a particular application, and externally supplied with electric power required for executing processing associated with the IC card. The processing associated with the IC card is executed using data on the RAM. Data which should be held and ensured even after the completion of processing is transferred from the RAM to the EEPROM.

JP-A-8-77081 and JP-A-9-259029 describe a buffer

This is a Continuation of Application No. 09/970,774, filed Oct. 5, 2001, which is a Continuation of Application No. 09/293,766, filed Apr. 19, 1999, the entire disclosures of which are hereby incorporated by reference. memory, and an EEPROM.

The prior art techniques have the following problems to solve. A time required for the IC card to complete processing requested by the information processing apparatus is predominantly dependent on a processing time required to update data in the EEPROM. It is necessary to continuously power the IC card from the outside and maintain the connection of the IC card with the information processing apparatus until the IC card notifies the information processing apparatus that data in RAM or the buffer memory has been transferred to the EEPROM.

SUMMARY OF THE INVENTION

It is an object of the present invention to reduce a time period in which an information processing apparatus is connected with an IC card.

It is another object of the present invention to charge an internal power supply unit built in an IC card using an external power supply unit.

It is a further object of the present invention to switch a power supply unit to use depending on the contents of processing performed on an IC card.

An IC card is provided with a processing execution unit for processing data received from an information processing apparatus using a volatile memory capable of updating stored data at a higher speed. Upon completion of the processing on the received data in the processing execution unit, the information processing apparatus is notified of the completion of the processing. When the data includes any portion which must be preserved, a power supply control unit stops an external power supply unit to switch to an internal power supply unit. Then, a memory contents transfer control unit transfers the data which must be preserved from the volatile memory to a non-volatile memory which updates stored data at a lower speed for storage therein.

BRIEF DESCRIPTION OF THE DRAWINGS

FIG. 7 is a flow chart illustrating the processing for transferring data from RAM to EEPROM; and FIG. 8 is a flow chart illustrating the processing for power supply control.

DETAILED DESCRIPTION OF THE EMBODIMENT

Figure 1:
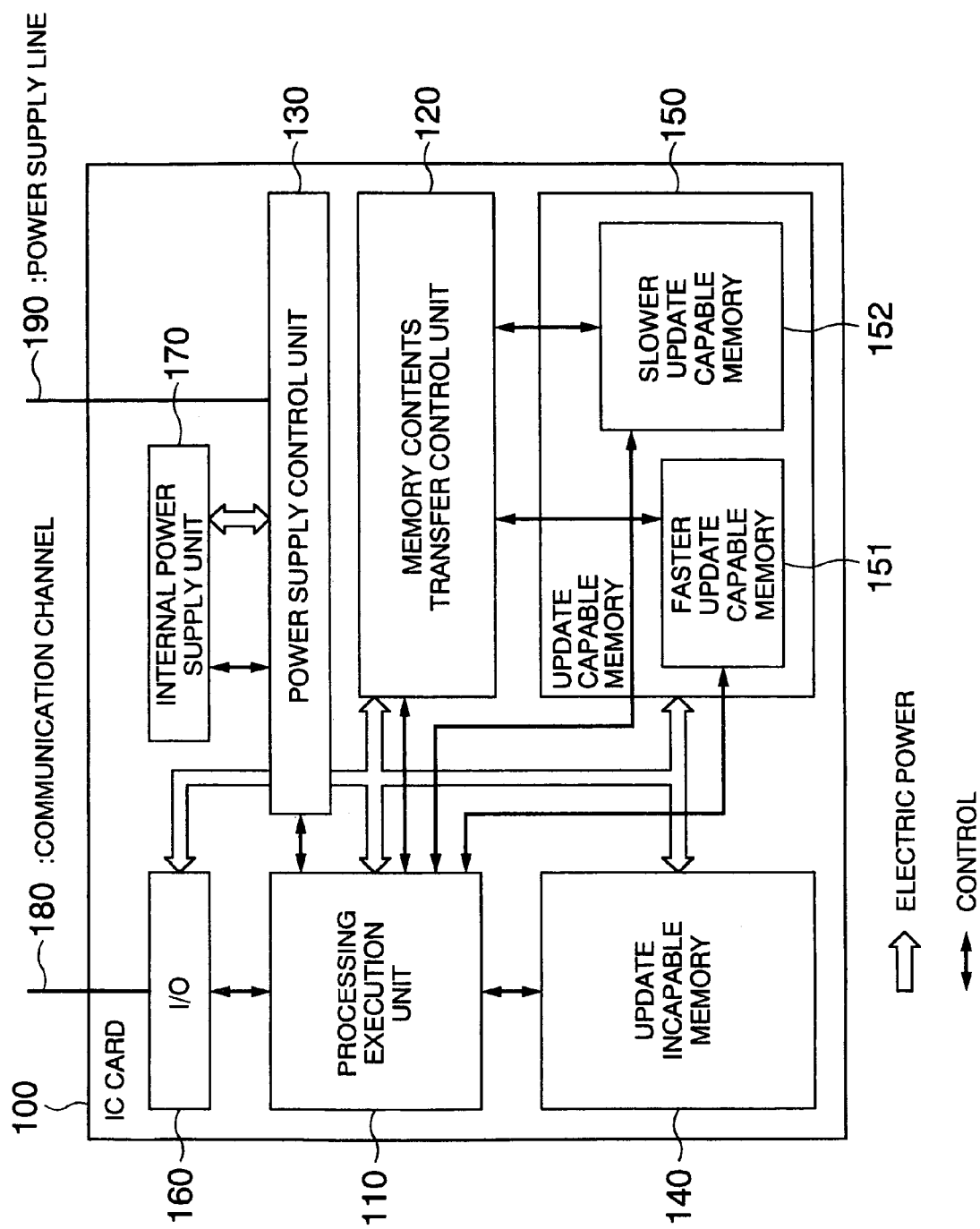
FIG. 1 is a block diagram illustrating the configuration of an IC card according to an embodiment of the present invention.

An embodiment of the present invention will hereinafter be described with reference to the accompanying drawings. FIG. 1 is a block diagram illustrating the functional configuration of an IC card 100 which implements an embodiment of the present invention. The IC card 100 is composed of a memory contents transfer control unit 120; a power supply control unit 130; a processing execution unit 110; and a read-only and thus update incapable memory (ROM) 140; a readable and thus update capable memory 150; an input/output interface (I/O) 160; and internal power supply unit (rechargeable buttery) 170. The IC card 100 is connected to an information processing apparatus through a communication channel 180, and connected to an external power supply unit through a power supply line 190. The IC card 100 is equipped, as the memory 150 which is capable of updating data stored therein, with a plurality of types of memories having different speeds for updating data. In FIG. 1, the IC card 100 is equipped with two types of memories: a fast memory 151 having a higher data update speed and a slow memory 152 having a lower data update speed.

Although illustration is omitted, the IC card 100 may be connected to an information processing apparatus in a non-contact fashion (through radio waves or the like). In this event, since electric power supplied from the communication channel 180 is used as external electric power, the power supply line 190 is connected from an electric power generator circuit disposed in the input/output interface (I/O) 160 to the power supply control unit 130.

Figure 2:
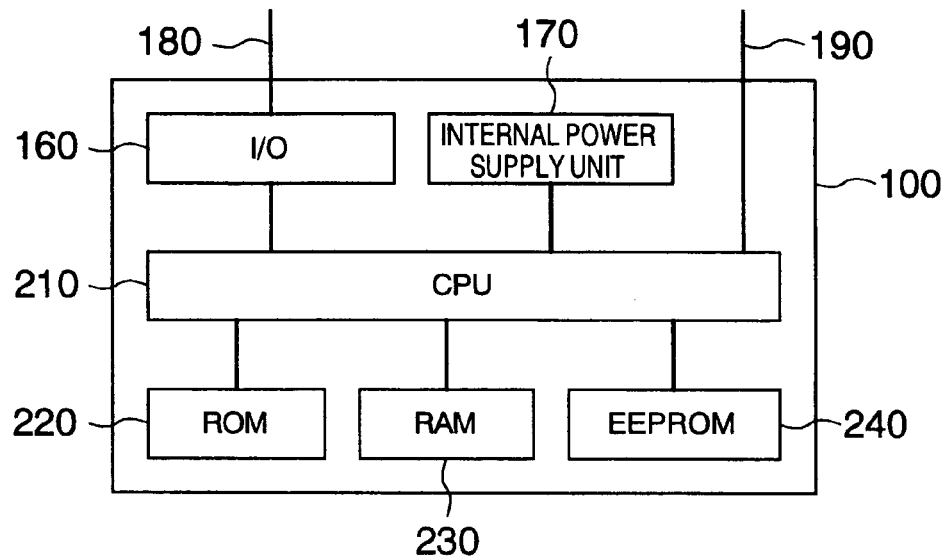
FIG. 2 is a block diagram illustrating the hardware configuration according to the embodiment of the present invention.

FIG. 2 is a block diagram illustrating the hardware configuration of the IC card 100. Specifically, FIG. 2 illustrates in block diagram form the hardware configuration required for a CPU 210 to execute the functions of the memory contents transfer control unit 120, the power supply control unit 130 and the processing execution unit 110. Generally, a CPU is implemented by a single semiconductor device so that power supply cannot be controlled for individual internal circuit blocks. Recently, with an increasingly higher density of circuits mounted in a semiconductor device, peripheral circuits can be incorporated in a CPU chip, and power supply control can also be performed individually for each of peripheral circuits incorporated therein. It should be noted that this embodiment can be equally applied to either a normal CPU or a CPU which is capable of controlling power supply to each of its peripheral circuits. When using a CPU capable of controlling power supply to each of peripheral circuits, the memory contents transfer control unit 120 and the power supply control unit 130 are each implemented as a peripheral circuit incorporated in the CPU 210. The power supply control for this case is similar to an embodiment of FIG. 3 as described below.

Figure 3:
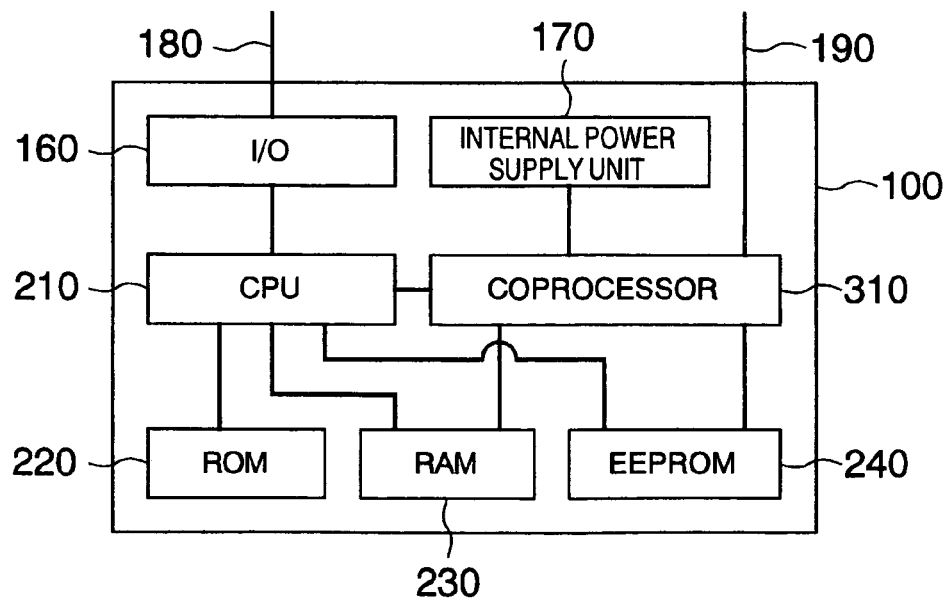
FIG. 3 is a block diagram illustrating a hardware configuration for realizing the present invention.

FIG. 3 is a block diagram illustrating another hardware configuration of the IC card 100. Specifically, FIG. 3 illustrates the hardware configuration when the functions of the memory contents transfer control unit 120 and the power supply control unit 130 are executed by a dedicated processor 310 (coprocessor) or implemented by a dedicated circuit, with the function of the processing execution unit 110 being executed by the CPU 210.

While the contents of a memory can be read out in either FIG. 2 or FIG. 3, the memory 140, which is capable of reading the stored contents therefrom but is not capable of updating the contents, corresponds to ROM 220; the fast memory 151, which is capable of reading and updating the stored contents, and has a higher memory contents update speed, corresponds to RAM 230; and the slow memory 152, which is similarly capable of reading and updating the stored contents, but has a lower memory update speed, corresponds to EEPROM 240. While the RAM 230 and EEPROM 240 are similar in that they are both capable of reading and updating their contents, the RAM 230 is a volatile memory which loses the contents stored therein when the power is off, whereas the EEPROM 240 is a non-volatile memory which does not lose the contents stored therein even if the power is off.

For bringing the IC card 100 into an executable state, it must be provided externally with electric power through the power supply line 190. The supplied electric power is distributed through the power supply control unit 130 to the memory contents transfer control unit 120 and the processing execution unit 110, the update incapable memory (hereinafter called the "ROM") 140; the memory 151 which can be updated and has a higher speed for updating the stored contents (hereinafter called the "RAM"); the memory 152 which can be updated and has a lower speed for updating the stored contents (hereinafter called the "EEPROM"), and the I/O 160, as well as to the internal power supply unit 170 for recharging.

The IC card 100 receives a processing request from the information processing apparatus through the I/O 160 by connection with the information processing apparatus through the communication channel 180. The processing execution unit 110 analyzes the contents of the received processing request, and causes the CPU 210 to execute the processing in accordance with the contents of the processing request. An example of execution method is to start and execute a processing program stored in the ROM 220 or the EEPROM 240 which meets the contents of the processing request. For the execution, data stored in the ROM 220 and the EEPROM 240 is used as required to store data in the RAM 230 or update data stored therein. Upon completion of the execution of the processing in the IC card 100 for responding to the processing request received from the information processing apparatus, information indicative of the completed processing or information on the processing result is transmitted to the information processing apparatus through the I/O 160. Some data which need be stored in the EEPROM 240 for storage and retention in the IC card 100, as a result of the processing executed in response to the processing request from the information processing apparatus, has been stored in the RAM 230 during the processing associated with the processing request, so that the data is transferred to a predetermined area in the EEPROM 240 asynchronously under the control of the memory contents transfer control unit 120. Here, "asynchronously" means that even if data which need be stored in the EEPROM 240 is produced in the RAM 230 during the processing associated with a processing request, the data is not transferred to the predetermined area in the EEPROM 240 each time such data is produced, but all data that need be stored in the EEPROM 240, accumulated during the processing, are collectively transferred from the RAM 230 to the predetermined area of the EEPROM 240 after the completion of the processing associated with the processing request.

Figure 4:
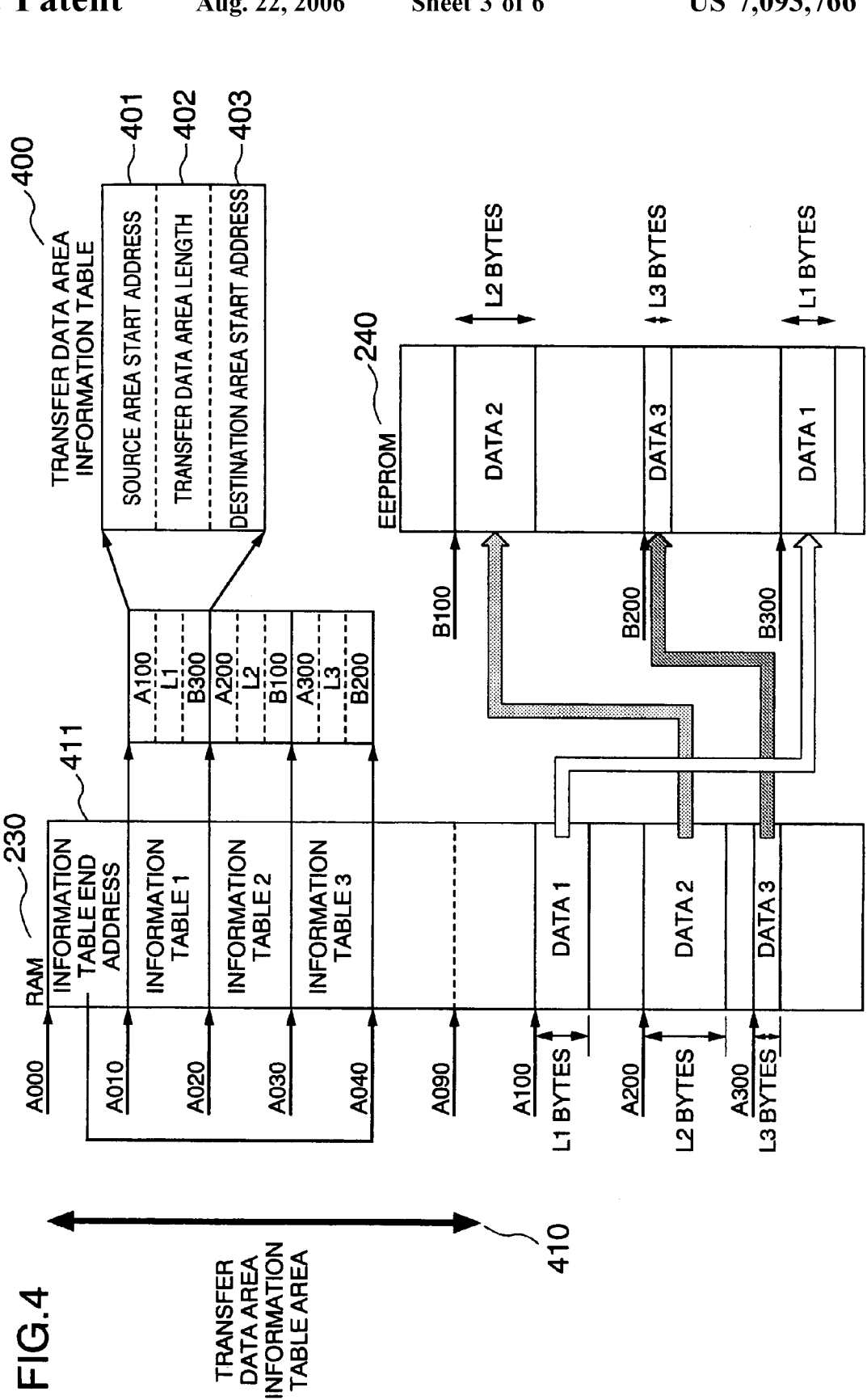
FIG. 4 shows a transfer data area information table used in the processing for controlling a transfer of memory contents.

FIG. 4 shows a memory map associated with a transfer data area information table which is stored in the RAM 230 for executing the processing of the memory contents transfer control unit 120. When data required to be stored in the EEPROM 240 is stored in the RAM 230, the memory contents transfer control unit 120 creates a fixed-length transfer data area information table (hereinafter simply called the "information table") 400 for storing a start address of an area in the RAM 230 for storing the data therein (source area start address) 401; a transfer data area length 402; and a start address of an area in the EEPROM 240 for storing the data therein (destination area start address) 403, and registers the information table 400 in a transfer data area information table area 410 in the RAM 230. The transfer data area information table area 410 is located such that its start address is always fixed, and is provided with a location 411 for storing an information table information end address at the head of the area 410.

FIG. 4 shows a state in which the transfer data area information table area 410 is allocated to a fixed area indicated by addresses from "A000" to "A090" in the RAM 230, wherein the information tables 1–3 are sequentially registered from address "A010", and the information table end address 411 contains address "A040" which is next to the end address of the information table 3.

In FIG. 4, the information table 1 indicates that data 1 is stored over the length of L1 bytes from address "A100" in the RAM 230, and that its destination is address "B300" in the EEPROM 240. Also, transfer data 2, 3 are indicated by the information tables 2, 3 in a similar manner in FIG. 4.

The memory contents transfer control unit 120 executes the memory contents transfer processing sequentially from the information table 1 with reference to the source area start address 401, the transfer area data length 402 and the destination data area start address 403 set in the information table 400, and terminates the transfer processing when the address next to a transferred information table exceeds an address set in the information table end address 411. "A010" set in the information table end address 411 indicates that no information table to be transferred is registered, while an address "A090" or higher set in the information table end address 411 indicates the transfer data area information table area 410 is used up by information tables.

Figure 5:
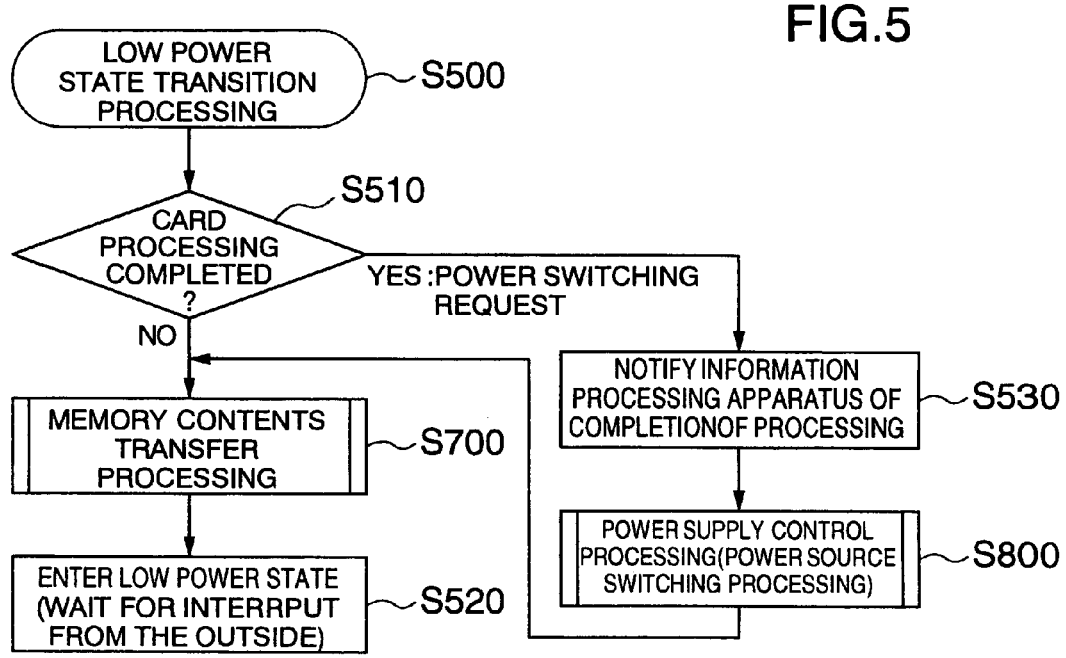
FIG. 5 is a flow chart illustrating the processing for invoking memory contents transfer control processing and power supply control processing.

FIG. 5 is a flow chart illustrating low power state transition processing (S500) executed by the processing execution unit 100 for invoking the memory contents transfer processing (S700) and power supply control processing (S800).

The IC card 100 transitions to a low power state (sleep state) for reducing power consumption when there is no processing to execute. The transition to the low power state is carried out when the IC card 100 is waiting for a processing request from the information processing apparatus or waiting for data to be received. Further, the IC card 100 also transitions to the low power state after it has completed predetermined processing, before it is disconnected from the information processing apparatus, and before external power supply is stopped.

In the lower power state transition processing (S500), it is first determined whether or not processing associated with the IC card 100 has been completed (S510). If the processing has been completed, the information processing apparatus is notified of the completion of the processing (S530), the power supply control processing is executed (S800), and then the memory contents transfer processing (S700) is entered. In the power supply control processing (S800), the IC card 100 is switched to an internal power supply unit to stop the external power supply, details of which will be described later. If the processing associated with the IC card 100 has not been completed, the memory contents transfer processing (S700) is entered. Details on the memory contents transfer processing (S700) will be described later. After executing the memory contents transfer processing (S700), low power state transition processing (S520) is executed to bring the IC card 100 into the sleep state. In the sleep state, the IC card 100 is waiting for a processing request or an interrupt for receiving data.

Figure 6:
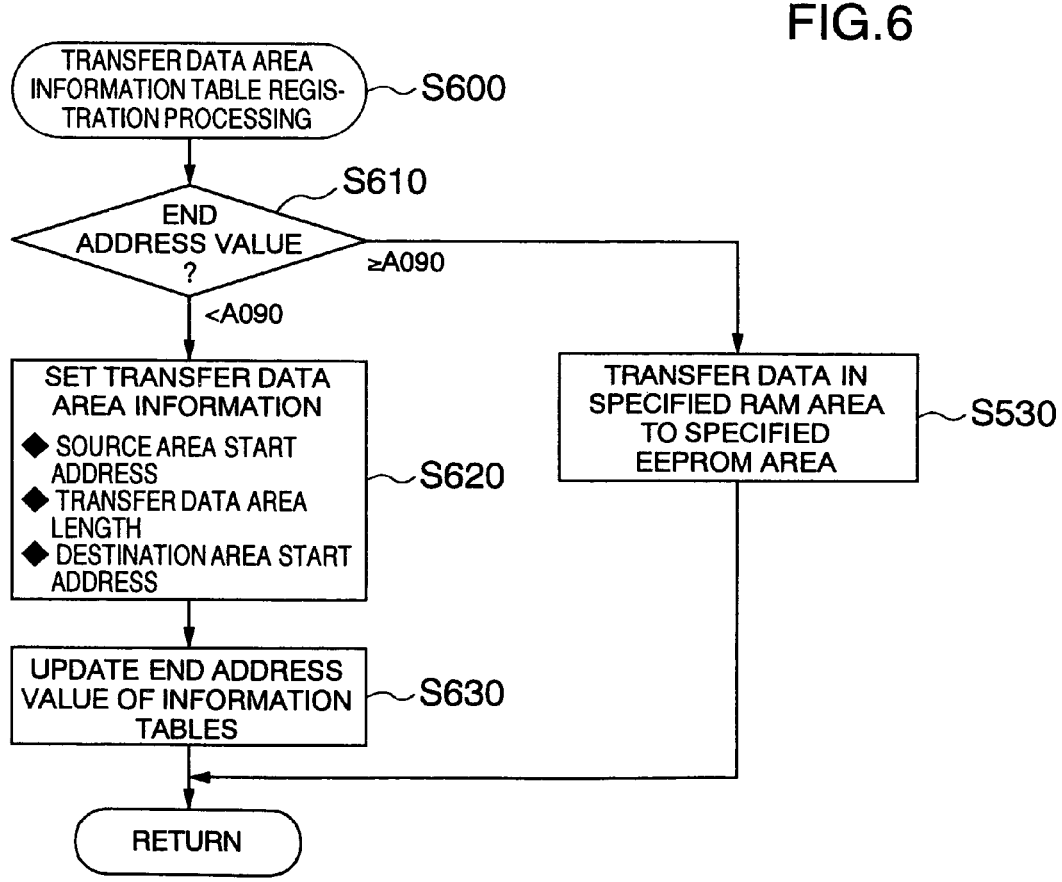
FIG. 6 is a flow chart illustrating the processing for registering data in a transfer data area information table.

FIG. 6 is a flow chart illustrating registration processing (S600) for registering the transfer data area information table (information table) 400 with data to be stored in the EEPROM 240 when such data is detected in the processing execution unit 110.

It is first determined whether or not an additional information table can be accepted to the information table 400 (S610). Specifically, the value of the information table end address 411 shown in FIG. 4 is compared with the area of the transfer data area information table 410 ("A000"–"A090") to determine whether or not an additional information table can be accepted in the area of the transfer data area information table 410. If no additional information table is acceptable in the area of the transfer data area information table 410, data transfer processing is executed for the information table to be added (S640). Specifically, data corresponding to the information table to be registered is written into a predetermined area in the EEPROM 240. Conversely, if an additional information table is acceptable, the source area start address 401, the transfer data length 402 and the destination area start address 403 are set based on the address or location indicated by the information table end address 411, and the additional information table is registered as an information table 400 (S620). After the information table has been registered, the length of the information table 400 is added to the value presently stored in the information table end address 411 (S630).

FIG. 7 is a flow chart illustrating memory contents transfer processing (S700) executed by the memory contents transfer control unit 120 for transferring data stored in the RAM 230 to a predetermined area in the EEPROM 240. It is first determined with reference to the value in the information table end address 411 whether or not any information table 400 is registered (S710). If no information table 400 is registered (In the case of FIG. 4, the value in the information table end address 411 is "A010"), the power supply control processing (S800) is executed (substantially, no processing is executed), followed by the termination of the memory contents transfer processing (S700). If some information tables 400 are registered, the first information table is designated as a target, and its start address is fetched (in the case of FIG. 4, the start address "A010" of the information table 1 is fetched) (Step S720). Subsequently, the validity is determined for a source area start address 401, the destination area start address 403 and the transfer data area length 403, set in the information table 400 (S730, S740, S750). If any invalid value is detected during the determination at S730–S750, the data contents transfer processing is aborted for the information table under processing, and the next information table is processed (in the case of FIG. 4, "A020" of the information table 2 is fetched) (S770). Conversely, if the validity is confirmed for the data registered in the information table 400 in the determination at S730–S750, data having a length indicated by a transfer data area length 403 in the RAM 203, indicted by the source area start address 401, is transferred to an area in the EEPROM 240 indicated by the destination area start address 403 (S760). After the completion of the transfer processing, the next information table is processed (S770). The address value of the information table fetched at S770 is compared with the value in the information table end address 411 (S780), and the processing from S730–S770 is repeated if the value of the start address of the information table to be next processed is less than the value in the information table end address 411. Conversely, if the value of the start address of the information table to be next processed is equal to or more than the value in the information table end address 411, this means that the memory contents transfer processing has been terminated. In FIG. 4, the information table 1 is used to transfer the contents of data having L1 bytes from address "A100" in the RAM area 230 to an area over L1 bytes from address "B300" in the EEPROM area 240. At the time the processing corresponding to the information tables 1–3 has been terminated, the information table end address 411 is set to a value "A010", and the power supply control processing (S800) is executed for stopping the power from the internal power supply unit, followed by the termination of the memory contents transfer processing (S700).

FIG. 8 is a flow chart illustrating the power supply control processing (S800) invoked from the low power state transition processing (S500) or from the memory contents transfer processing (S700), and executed by the power supply control unit 130.

It is first determined whether or not a request has been made for switching the power source from an external power supply to an internal power supply unit 170 (S810). If such a switching request is made (invoked from S510), the power source is switched to the internal power supply unit 170

(S850). Conversely, if no power supply switching request is made, it is determined whether or not an internal power supply stop request is made (S820). If the stop request is made, it is determined whether or not processing in the IC card 100 has been terminated (S860), and the power from the internal power supply unit 170 is stopped if the processing has been terminated in the IC card 100 (S870), whereas the power from the internal power supply unit 170 is maintained if the processing has not been terminated. If neither the power supply switching request nor the internal power supply stop request is found in the determination at S810, S820 (though illustration is omitted, the power supply control processing (S800) is started when the IC card 100 is connected to the information processing apparatus, and the IC card 100 enters this state), the power source is set to any external power (S830), and the IC card 100 is set such that the supplied external power can be accumulated (charged) in the internal power supply unit 170 (S840).

When the power source has been switched to the internal power supply unit 170 (S850), data stored in the RAM 230 will not be lost even if the externally supplied power to the IC card 100 is stopped, since the internal power supply unit 170 is supplying the power to the RAM 230, so that the memory contents transfer processing can be executed. Thus, at the time data required to be stored in the EEPROM 240 is stored in the RAM 230 which can update stored contents faster than the EEPROM 240, the information processing apparatus is notified that the processing in the IC card 100 has been completed, so that the IC card 100 can be disconnected from the information processing apparatus. As a result, the amount of IC card processing per unit time can be increased in a system which uses the IC card as a memory card or a prepaid card.

With the memory contents transfer control unit 120, as described above, provided in the IC card, the processor equipped in the IC card can execute the memory contents transfer processing during an inoperative state thereof, instead of sequentially transferring data, required to be stored in the EEPROM 240, from the RAM 230 to the EEPROM 240 each time such data is produced during the execution of processing requested from the information processing apparatus, thereby improving the operation efficiency of the processor. It is therefore possible to reduce a time period from the time the IC card is connected to the information processing apparatus to the time the IC card executes processing for a request from the information processing apparatus, and notifies the information processing apparatus of the completion of the processing corresponding to the request.

Also, since the IC card is provided with the internal power supply unit and the power supply control unit for supplying the power for the memory contents transfer control unit to complete the transfer processing, data, the contents of which must be ensured, can be temporarily stored in the faster memory area capable of updating the stored contents at a higher speed, and the IC card can notify the information processing apparatus of the completion of the processing within the IC card at the time the IC card has completed all processing except for the memory contents transfer processing for transferring the temporarily stored data to a target memory area. Even if external power supply is interrupted to the IC card and the information processing apparatus in this state, the memory transfer processing can be executed under the control of the memory contents transfer control unit by supplying the power without interruption from the internal power supply unit equipped in the IC card, thereby making it possible to reduce a time period in which the IC card is connected to the external information processing apparatus and to the external power supply unit.

In a system which employs the IC card of the present invention as a memory card or a prepaid card, since the system can reduce a time period from the time the IC card is connected to an information processing apparatus to the time the IC card can be disconnected from the information processing apparatus upon completion of processing, it is possible to increase the number of processed IC cards per unit time of the information processing apparatus. Particularly, when the IC card is used in a ticket examination system or a tollhouse system in traffic organizations, an increase in the number of processed IC cards per unit time effectively alleviates confusion or traffic jam at a ticket barrier or a tollhouse.

It will be appreciated from the foregoing that according to the present invention, a faster memory is used to execute processing associated with the IC card, and the IC card notifies an information processing apparatus connected thereto of the completion of the processing at the time the processing is completed, thereby resulting in a reduction in a time period in which the IC card is connected with the information processing apparatus.

What is claimed is:

1. An IC card for connection with an information processing apparatus to perform an operation therewith, said IC card comprising:
a processing execution unit to execute processing based on a request from said information processing apparatus and to notify said information processing apparatus of completion of said processing when said operation is completed;
a volatile memory to temporarily store data for executing said processing in said processing execution unit;
a non-volatile memory to store data, said contents of which must be preserved; and
a memory contents transfer control unit to transfer data, which must be preserved, from said volatile memory to said non-volatile memory during an inoperative state of said processing execution unit.

2. An IC card according to claim 1, further comprising:
an internal power supply unit for use by said memory contents transfer control unit to transfer said data, the contents of which must be ensured; and
a power supply control unit to stop power from an external power supply unit to switch to said internal power supply unit.

3. An IC card according to claim 2, wherein said power supply control unit accumulates power from said external power supply unit in said internal power supply unit when said IC card is connected to said external power supply unit.

4. An IC card according to claim 1, wherein said memory contents transfer control unit transfers data stored in a predetermined area of said volatile memory to said non-volatile memory.

5. An IC card according to claim 1, wherein said processing is executed by said processing execution unit using a CPU, said volatile memory and a coprocessor.

6. An IC card according to claim 1, wherein said data to be transferred from said volatile memory to said non-volatile memory has been previously specified.

7. An IC card according to claim 6, wherein said data to be transferred is specified by an address in said non-volatile memory.

8. A method of storing data in an IC card for connection with an information processing apparatus to perform an operation therewith, said method comprising the steps of:
processing said data received from said information processing apparatus by a processing execution unit using a volatile memory for temporarily storing data for said processing;

transferring data, which must be preserved, from said volatile memory to a non-volatile memory by a memory contents transfer control unit during an inoperative state of said processing execution unit; and notifying said information processing apparatus of completion of said processing, when said operation is completed.

* * * * *